United States Patent
Prendergast

(10) Patent No.: US 7,996,917 B2
(45) Date of Patent: Aug. 16, 2011

(54) ROTATABLE HELMET MOUNTING ASSEMBLY

(75) Inventor: Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 1017 days.

(21) Appl. No.: 11/100,141

(22) Filed: Apr. 5, 2005

(65) Prior Publication Data

US 2008/0184462 A1    Aug. 7, 2008

(51) Int. Cl.
    *A42B 3/00* (2006.01)
(52) U.S. Cl. .................................. 2/6.2; 2/410
(58) Field of Classification Search .............. 2/410, 6.2; 403/76, 90, 114, 115, 122, 127, 144, 131
    See application file for complete search history.

(56) References Cited

U.S. PATENT DOCUMENTS

| | | | |
|---|---|---|---|
| 1,226,101 A | | 5/1917 | Marsden |
| 1,645,023 A | * | 10/1927 | Richards .................. 269/68 |
| 1,780,383 A | * | 11/1930 | Green ....................... 248/181.2 |
| 2,284,180 A | | 5/1942 | Thomas |
| 2,517,892 A | | 8/1950 | Larrabee et al. |
| 3,059,948 A | * | 10/1962 | Thompson et. al. ......... 403/90 |
| 3,072,426 A | * | 1/1963 | Gilbert ....................... 403/115 |
| 4,156,292 A | | 5/1979 | Helm et al. |
| 4,449,787 A | | 5/1984 | Burbo et al. |
| 4,553,873 A | | 11/1985 | Salice |
| 4,577,347 A | | 3/1986 | Connon |
| 4,620,813 A | * | 11/1986 | Lacher .......................... 403/93 |
| 4,660,943 A | | 4/1987 | Ellis |
| 4,671,697 A | | 6/1987 | Ando et al. |
| 4,689,834 A | | 9/1987 | McCarthy et al. |
| 4,697,783 A | | 10/1987 | Kastendieck et al. |
| 4,734,939 A | | 4/1988 | Copp |
| 4,987,608 A | | 1/1991 | Cobb |
| 5,176,342 A | | 1/1993 | Schmidt et al. |
| 5,179,735 A | | 1/1993 | Thomanek |
| 5,226,181 A | | 7/1993 | Polednak et al. |
| 5,331,684 A | | 7/1994 | Baril et al. |
| 5,339,464 A | | 8/1994 | Dor |
| 5,347,119 A | | 9/1994 | Connors |
| 5,408,086 A | * | 4/1995 | Morris et al. ........... 250/214 VT |
| 5,465,124 A | | 11/1995 | Nussenbaum |
| 5,467,479 A | | 11/1995 | Mattes |
| 5,469,578 A | | 11/1995 | Mattes |

(Continued)

FOREIGN PATENT DOCUMENTS

EP    1 202 104 A1    5/2002

(Continued)

OTHER PUBLICATIONS

U.S. Appl. No. 10/820,977, entitled Shroud Plate Attachment, by inventor Prendergast, filed Apr. 7, 2004.

(Continued)

*Primary Examiner* — Shaun R Hurley
*Assistant Examiner* — Andrew W Sutton
(74) *Attorney, Agent, or Firm* — Christie, Parker & Hale, LLP

(57) ABSTRACT

A mounting assembly for universally rotatably adjusting a night vision device with respect to a helmet is provided that includes a first attachment mechanism for connection to the night vision device; a second attachment mechanism for connection to the helmet; and a universally rotatable joint for universally rotatably adjusting the night vision device with respect to the helmet.

15 Claims, 4 Drawing Sheets

U.S. PATENT DOCUMENTS

| | | | |
|---|---|---|---|
| 5,471,678 | A | 12/1995 | Dor |
| 5,506,730 | A | 4/1996 | Morley et al. |
| 5,542,627 | A | 8/1996 | Crenshaw et al. |
| 5,581,806 | A | 12/1996 | Capdepuy et al. |
| 5,648,862 | A | 7/1997 | Owen |
| 5,703,354 | A | 12/1997 | Wannagot et al. |
| 5,822,126 | A | 10/1998 | Cursolle et al. |
| 5,914,816 | A | 6/1999 | Soto et al. |
| 6,249,386 | B1 | 6/2001 | Yona et al. |
| D449,411 | S | 10/2001 | Largeot |
| 6,347,776 | B1 * | 2/2002 | Chuang .................... 248/288.51 |
| 6,352,228 | B1 * | 3/2002 | Buerklin .................... 248/181.1 |
| 6,457,179 | B1 | 10/2002 | Prendergast |
| 6,462,867 | B2 | 10/2002 | Choinere |
| 6,467,929 | B2 * | 10/2002 | Lee ................................ 362/191 |
| 6,472,776 | B1 * | 10/2002 | Soto et al. .................... 307/400 |
| 6,540,426 | B2 * | 4/2003 | Cloyd et al. ................. 403/122 |
| 6,751,810 | B1 | 6/2004 | Prendergast |
| 6,862,748 | B2 | 3/2005 | Prendergast |
| 7,100,881 | B2 * | 9/2006 | Worrall ...................... 248/278.1 |
| 7,114,869 | B2 * | 10/2006 | MacMillan ....................... 401/5 |
| 2002/0120979 | A1 | 9/2002 | Prendergast |
| 2004/0181855 | A1 | 9/2004 | Prendergast |
| 2004/0244099 | A1 | 12/2004 | Prendergast |

FOREIGN PATENT DOCUMENTS

| | | |
|---|---|---|
| EP | 1 202 566 A1 | 5/2002 |
| WO | WO 2004/090580 A2 | 10/2004 |
| WO | WO 2004/090580 A3 | 10/2004 |

OTHER PUBLICATIONS

U.K Search Report dated Aug. 4, 2006.

* cited by examiner

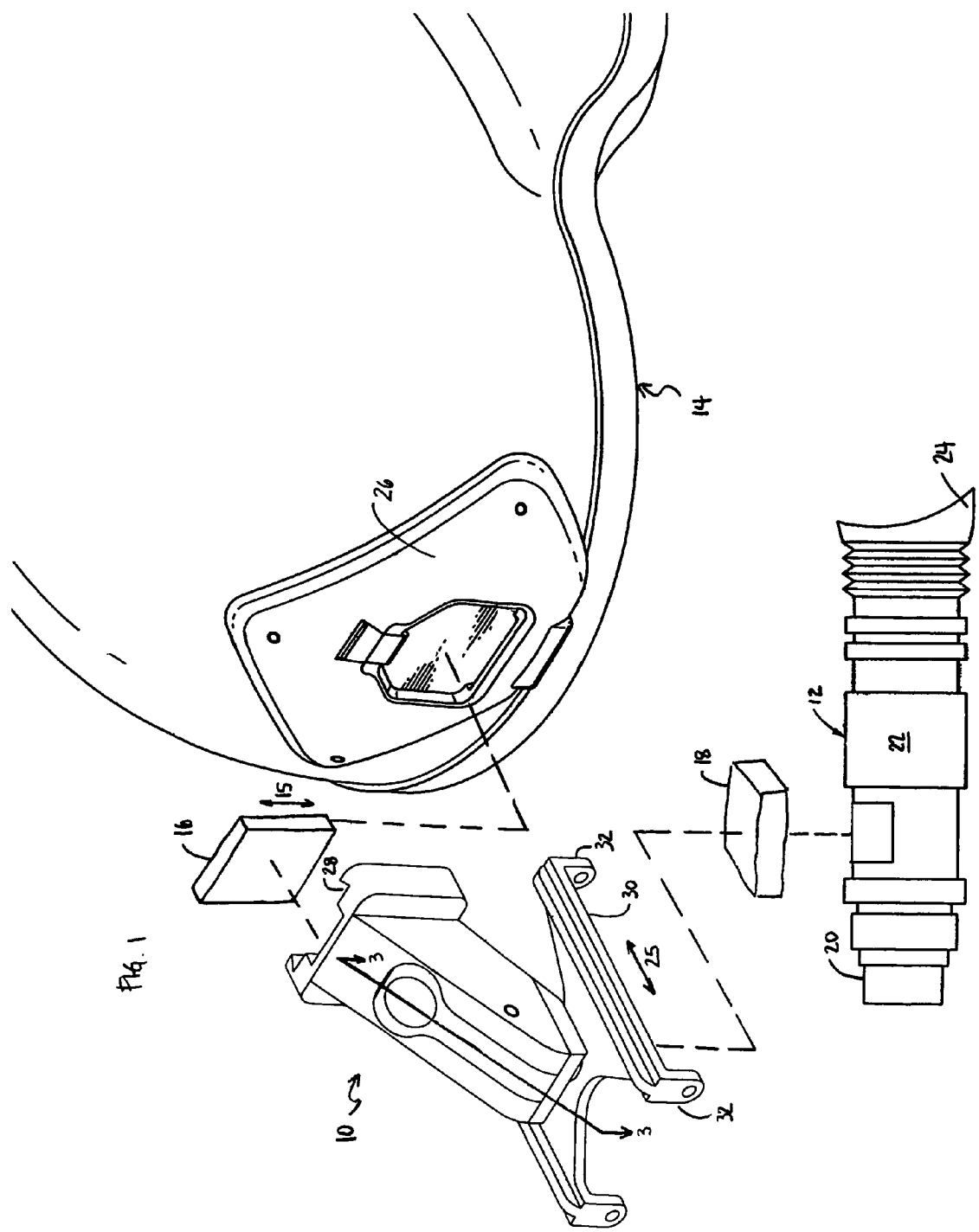

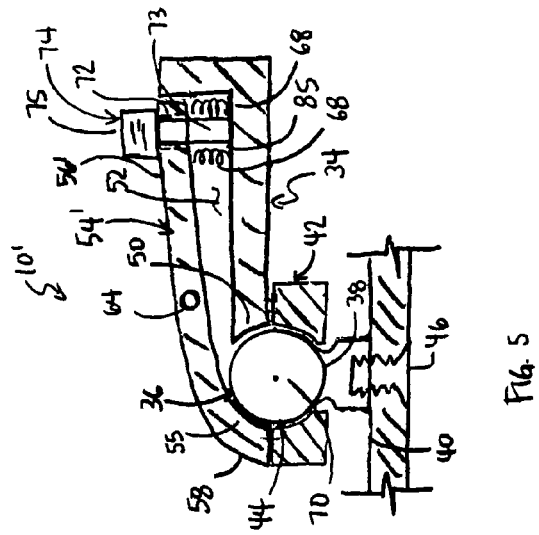

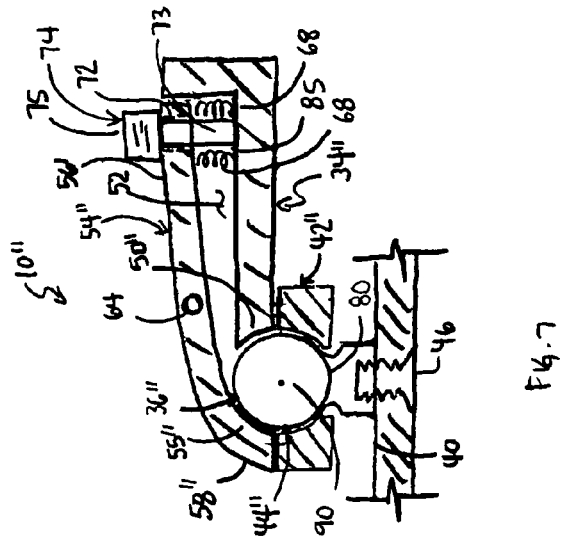
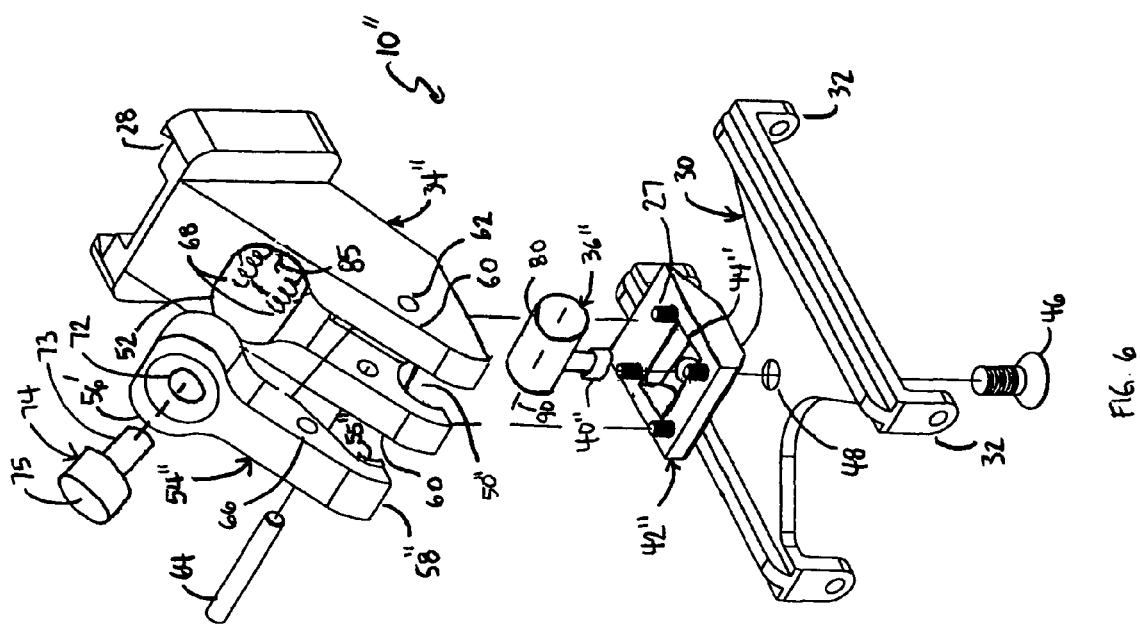

ROTATABLE HELMET MOUNTING ASSEMBLY

FIELD OF THE INVENTION

This invention relates generally to a mounting assembly for attachment to a night vision device and for further attachment to a helmet, and more particularly to such a mounting assembly having a universally rotatable portion for allowing the night vision device to be rotatably adjusted with respect to the helmet about a plurality of planes.

BACKGROUND OF THE INVENTION

Night vision devices are commonly used by military personnel for conducting operations in low light or night conditions. The night vision devices used by the military typically include image intensifier tubes and associated optics that convert infrared and near infrared light into viewable images.

Mounting assemblies for mounting night vision devices to helmets are well-known in the art. Preferred ones of these mounting assemblies are attached to a helmet in a manner that allows a user to view a scene through the night vision device without having to hold the night vision device.

Some of these mounting assemblies include mechanisms for adjusting the position of the night vision device with respect to the user's eyes, such as a vertical adjustment mechanism (adjusting the device up or down with respect to the user's eyes); a horizontal adjustment mechanism (adjusting the device toward or away from the user's eyes); and/or a tilt adjustment mechanism (adjusting the device pivotally about a single plane, the user's line of sight.)

Such adjustment mechanisms provide a wide range of adjustability of the night vision device for proper orientation of the device with respect to the user's eyes, and therefore a more efficient use of the night vision device. However, an even greater degree of adjustability may be obtained by use of a mounting assembly having a rotatable portion that is universally rotatable. That is, having the ability to be rotated about a variety of different planes of rotation.

Accordingly, a need exists for an improved mounting assembly, which includes a universally rotatable portion for increasing the adjustability of the mounting assembly.

SUMMARY OF THE INVENTION

In one embodiment, the present invention is a mounting assembly for universally rotatably adjusting a night vision device with respect to a helmet that includes a first attachment mechanism for connection to the night vision device; a second attachment mechanism for connection to the helmet; and a universally rotatable joint for universally rotatably adjusting the night vision device with respect to the helmet.

In another embodiment, the mounting assembly as described above further includes a body portion connected to the first attachment mechanism, and a platform connected to the second attachment mechanism. In this embodiment, the assembly also includes a ball joint disposed between the body portion and the platform for universally rotatably adjusting the night vision device with respect to the helmet; and a lever pivotally connected to the body portion and having a head portion and a gripping portion. According to this embodiment, the body portion includes a first recess for receiving the ball joint and a second recess for receiving the lever, and the gripping portion is pivotal into and out of contact with the ball joint.

In yet another embodiment, the present invention is a mounting assembly for tiltably adjusting a night vision device with respect to a helmet that includes a first attachment mechanism for connection to the night vision device; a second attachment mechanism for connection to the helmet; a body portion connected to the first attachment mechanism; and a platform connected to the second attachment mechanism. A tilt joint, such as a cylindrical bearing is disposed between the body portion and the platform for tiltably adjusting the night vision device with respect to the helmet. A lever is pivotally connected to the body portion and includes a head portion and a gripping portion, wherein the body portion includes a first recess for receiving the tilt joint and a second recess for receiving the lever. The gripping portion is pivotal into and out of contact with the tilt joint, and the head portion of the lever is easily accessible by either hand of the user.

Other features and advantages of the present invention will become apparent from the following detailed description, taken in conjunction with the accompanying drawings which illustrate, by way of example, the features of the present invention.

BRIEF DESCRIPTION OF THE DRAWINGS

FIG. 1 is a perspective view of a mounting assembly according to one embodiment of the present invention being attached to a helmet and further attached to a night vision device, shown in side view;

FIG. 4 is an exploded perspective view of a mounting assembly according to another embodiment of the present invention;

FIG. 5 is a cross-sectional view of the mounting assembly of FIG. 4, similar to the cross-sectional view of FIG. 3.

FIG. 6 is an exploded perspective view of a mounting assembly according to yet another embodiment of the present invention; and FIG. 7 is a cross-sectional view of the mounting assembly of FIG. 6, similar to the cross-sectional view of FIG. 3.

DETAILED DESCRIPTION OF THE DRAWINGS

Figure 3:
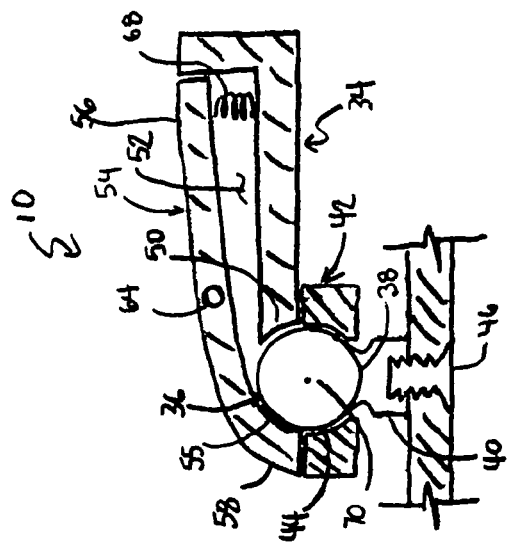
FIG. 3 is a cross-sectional view of the mounting assembly of FIG. 1 taken along the line 3-3 of FIG. 1.

As shown in FIGS. 1-7, embodiments of the present invention are directed to a mounting assembly for attachment to a night vision device, and for further attachment to a helmet to be worn by a user. In one embodiment, the mounting assembly includes a universally rotatable portion that allows the user to rotatably adjust the night vision device with respect to the user's eyes about a plurality of planes. As used herein the term universally rotatable is meant to refer to the ability to be rotated about any plane of rotation.

FIG. 1 shows a mounting assembly 10 according to one embodiment of the present invention for attaching a night vision device 12 to a helmet 14. In the embodiment of FIG. 1, the night vision device 12 includes a single objective lens 20, a housing 22 and a pair of eye pieces 24. In use, a user looks into the eye pieces 24 to see an enhanced image representative of the low-level light from a night scene which has entered the objective lens 20. In one embodiment, the night vision device 12 is a PVS7 night vision goggle, currently manufactured by ITT Corporation of Roanoke, Va.

In the embodiment of FIG. 1, the helmet 14 is a standard U.S. Army Kevlar composite helmet. An example of such a helmet 14 is shown in U.S. Design Pat. 449,411 to Largeot and is currently manufactured by CGF Helmets, Inc. of Akron, Ohio. However, in other embodiments, other helmets and/or other headgear may be used with the mounting assemblies 10/10'/10" of the present invention.

As shown in FIG. 1, the mounting assembly 10 includes a helmet mounting portion 16 and a night vision device mounting portion 18, each shown schematically. The helmet mounting portion 16 may be attached to the helmet 14 by any one of a variety of methods known in the art, such as any of the embodiments disclosed in U.S. patent application Ser. No. 10/802,977, filed on Apr. 7, 2004, the disclosure of which is incorporated herein by reference. The helmet 14 may also include a shroud plate 26 for removably receiving the helmet mounting portion 16 of the mounting assembly 10. Exemplary shroud plates 26 include the embodiments disclosed in U.S. patent application Ser. No. 10/802,977.

The night vision device mounting portion 18 of the mounting assembly 10 may be attached to the night vision device 12 by any one of a variety of methods known in the art, such as any of the embodiments disclosed in U.S. Pat. No. 6,472,776, filed on Mar. 30, 2000, the disclosure of which is incorporated herein by reference.

Preferably, the mounting assembly 10 includes a mechanism for vertically adjusting the position of the night vision device 12 with respect to the helmet 14, allowing a user to vertically adjust the night vision device 12 (as shown by double arrow 15) with respect to the user's eyes. In one embodiment, the helmet mounting portion 16 of the mounting assembly 10 is slidably mounted to a dovetailed portion 28 of the mounting assembly 10, allowing for such a vertical adjustment.

Also preferably, the mounting assembly 10 includes a mechanism for horizontally adjusting the position of the night vision device 12 with respect to the helmet 14, allowing a user to laterally adjust the night vision device 12 (as shown by double arrow 25) with respect to the user's eyes. In one embodiment, the night vision device mounting portion 18 of the mounting assembly 10 is slidably mounted to a platform 30 on the mounting assembly 10, allowing for such a horizontal adjustment.

For example, in one embodiment the platform 30 includes arms 32 that receive a notched rail (not shown) therebetween. The night vision device mounting portion 18, in turn, includes an arm that slides along the notched rail, and may be lockingly engaged with any desired one of the notches to horizontally adjust the night vision device 12. The night vision device mounting portion 18 of the mounting assembly 10 is further removably or fixedly attached to the night vision device 12.

In one embodiment, adjustment devices from any one of the embodiments disclosed in U.S. Pat. No. 6,472,776, filed on Mar. 30, 2000, for vertically adjusting, horizontal adjusting, and/or rotating the night vision device 12 from a use position to a stowed position may be used with the mounting assembly 10 of the present invention. Although the helmet mounting portion 16 and the night vision device mounting portion 18 are each shown schematically in FIG. 1 as single components, these portions 16 and 18 may each include multiple parts.

Figure 2:
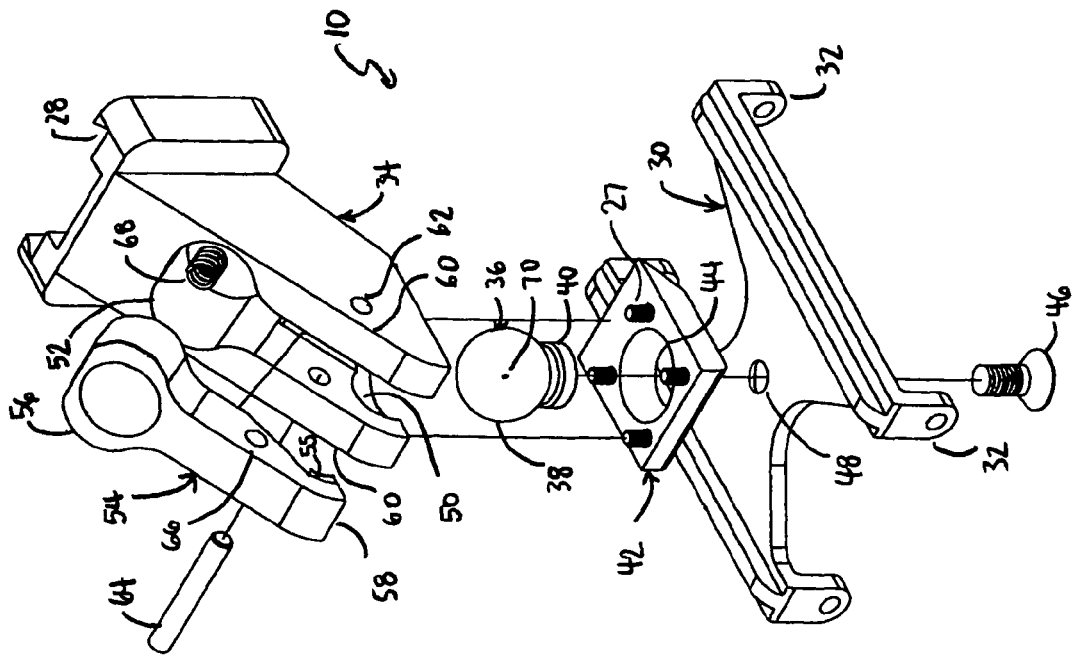
FIG. 2 is an exploded perspective view of the mounting assembly of FIG. 1.

FIG. 2 shows the mounting assembly 10 in an exploded view. As shown in FIG. 2, the mounting assembly 10 includes a body portion 34 connected to the platform 30 of the mounting assembly 10 by a universally rotatable joint 36. In the embodiment of FIG. 2, the universally rotatable joint 36 is a ball joint. The ball joint 36 includes a substantially spherical ball 38 having a collar 40 integrally formed therewith or otherwise attached thereto.

As shown in FIG. 2, disposed between the ball joint 36 and the platform 30 is a bearing plate 42 having a circular recess 44 formed therein for receiving a lower portion of the spherical ball 38 of the ball joint 36. As shown in FIG. 3, when the lower portion of the spherical ball 38 is disposed in the circular recess 44 of the bearing plate 42, the collar 40 extends below the bearing plate 42 for attachment to the platform 30 of the mounting assembly 10.

As is also shown in FIG. 3, the collar 40 includes an internally threaded end aligned with an opening 48 in the platform. A fastener 46 extends through the opening in the platform 30 and threadably engages the internally threaded end of the collar 40 to non-rotatably secure the ball joint 36 to the platform 30. As such, the ball joint 36 is also non-rotatably secured to the night vision device 12, which is mounted to the platform 30 through the night vision device mounting portion 18 of the mounting assembly 10.

The body 34 of the mounting assembly 10 includes a circular recess 50 for receiving an upper portion of the spherical ball 38 of the ball joint 36. One or more fasteners 27, such as four fasteners 27 in the embodiment of FIG. 2, connect the bearing plate 42 to the body 34 of the mounting assembly 10, such that the bearing plate circular recess 44 and the mounting assembly body circular recess 50 combine to form a partially enclosed spherical cavity for receiving the spherical ball 38 of the ball joint 36.

The body 34 of the mounting assembly 10 also includes a second recess 52, which extends into the mounting assembly body circular recess 50. The second recess 52 receives a lever 54 having a head portion 56, a gripping portion 58, and a laterally extending through hole 66, which is aligned with through holes 62 laterally extending through sidewalls 60 in the mounting assembly body 34. With the through holes 62 and 66 so aligned, a dowel pin or roll pin 64 is inserted into and press fit within each of the through holes 62 and 66 to pivotally attach the lever 54 to the mounting assembly body 34.

Also disposed within the second recess 52 of the mounting assembly body 34, and attached thereto by any appropriate means, is a biasing element, such as a compression spring 68. The compression spring 68 biases the head portion 56 of the lever 54 away from the second recess 52 of the mounting assembly body 34, such that the gripping portion 58 of the lever 54 is pivoted about the roll pin 64 and into contact with the spherical ball 38 of the ball joint 36.

When the gripping portion 58 of the lever 54 is thus contacted with the spherical ball 38, an inner surface of the gripping portion 58 of the lever 54 completes the upper portion of the spherical cavity partially formed by the bearing plate circular recess 44 and the mounting assembly body circular recess 50.

With the gripping portion 58 of the lever 54 biased into contact with the spherical ball 38 by the compression spring 68, the gripping portion 58 of the lever 54 forces the spherical ball 38 against the sidewalls which define the bearing plate circular recess 44 and the mounting assembly body circular recess 50, preventing the spherical ball 38 from rotating therein.

However, by applying a force on the head portion 56 of the lever 54 sufficient to overcome the biasing force of the compression spring 68, the head portion 56 of the lever is depressed into the second recess 52 of the mounting assembly body 34, and the lever 54 is pivoted about the roll pin 64 and away from the spherical ball 38. This causes the gripping portion 58 of the lever 54 to be disengaged from the spherical ball 38, and allows the spherical ball 38 to be freely rotated within the partially enclosed spherical cavity formed by the bearing plate circular recess 44 and the mounting assembly body circular recess 50 about any plane which extends through the center 70 of the spherical ball 38. As such, with the head portion 56 of the lever 54 depressed, the mounting assembly body 34 is universally rotatable with respect to the mounting assembly platform 30, and hence the night vision device 12, which is connected to the mounting assembly platform 30, is universally rotatable with respect to the helmet 14, which is connected to the mounting assembly body 34. Consequently, when a user desires to rotatably adjust the night vision device 12 with respect to the user's eyes, the user depresses the head portion 56 of the lever 54 with one hand and universally rotates the night vision device 12 with the other hand until a desired adjustment of the night vision device 12 is achieved.

After a desired adjustment of the night vision device 12 has been made, the head portion 56 of the lever 54 may be released causing the compression spring 68 to force the gripping portion 58 of the lever 54 back into contact with the spherical ball 38 of the ball joint 36. Thus holding the spherical ball 38 against rotation and allowing the desired adjusted position of the night vision device 12 to be maintained.

However, in one embodiment, even in this rotation locking position the user can rotatably adjust the night vision device 12 without depressing the head portion 56 of the lever 54 upon the exertion of a relatively large force on the night vision device 12. In such an embodiment, the required force on the night vision device 12 is dependent on the spring force of the compression spring. Also, in such an embodiment, a rotational adjustment may be made upon the application of a much smaller force by depressing the head portion 56 of the lever 54 to release the spherical ball 38 from contact with the gripping portion 58 of the lever 54.

In one embodiment, such as that shown in FIG. 2, the head portion 56 of the lever 54 is accessible by either hand of the user. This may be accomplished by placing the head portion 56 of the lever 54 in a position substantially centered about an upper surface of the mounting assembly 10. Some mounting assemblies according to the prior art are tiltable about a single plane by movement of a tilt arm, which extends from a side of the mounting assembly. In such an arrangement, a titling adjustment may only be comfortably made by one hand of the user, the hand on the side of the tilt arm. Such an arrangement can be frustrating to a user whose dominate hand is opposite from the position of the tilt arm. To avoid this problem, the head portion 56 of the lever 54 in one embodiment of the present invention is positioned to be easily accessible by either hand of the user.

In one embodiment, a frictional material 55 is attached to an inner surface of the gripping portion 58 of the lever 54, in order to allow the gripping portion 58 of the lever 54 to more securely hold the spherical ball 38 against rotation when the head portion 56 of the lever 54 is not depressed. For example, in one embodiment the frictional material 55 is a compressible material, such as rubber, and the spherical ball 38 is a hard material, such as a metal.

FIGS. 4 and 5 show another embodiment of the mounting assembly 10'. The mounting assembly 10' of FIGS. 4 an 5 contains many components which are identical to those of the mounting assembly 10 of FIGS. 2 and 3. As such, the description below focuses primarily on the features of the mounting assembly 10' of FIGS. 4 and 5 which are different from that of the mounting assembly 10 of FIGS. 2 and 3.

As shown in FIGS. 4 and 5, disposed within the second recess 52 of the mounting assembly body 34, and attached thereto by any appropriate means, is the compression spring 68. In this embodiment, the second recess 52 of the mounting assembly body 34 preferably includes two compression springs 68.

As is also shown in FIGS. 4 an 5, the head portion 56' of the lever 54' includes a locking screw 74. The locking screw 74 includes a rotating knob 75, which extends from the head portion 56' of the lever 54', and a threaded shaft 73, which threadably engages a threaded opening 72 in the head portion 56' of the lever 54'.

As with the embodiment of FIGS. 2 and 3, when a user desires to rotatably adjust the night vision device 12, the user depresses the head portion 56' of the lever 54'; universally adjusts the night vision device 12 to a desired position; and releases the head portion 56' of the lever 54' when the desired adjustment has been achieved to secure the night vision device 12 in the desired position as described above.

However, with the embodiment of FIGS. 4 and 5, when the night vision device 12 is at a desired rotational orientation with respect to the user's eyes, the locking screw 74 may be used to prevent further rotational adjustment of the night vision device 12.

For example, the user can turn the locking screw knob 75 in a direction which threads the locking screw shaft 73 into the threaded opening 72 of the head portion 56' of the lever 54' until the end of the locking screw shaft 73 contacts an inner surface 85 of the second recess 52. With the end of the locking screw shaft 73 contacting the inner surface 85 of the second recess 52, the head portion 56' of the lever 54' cannot be depressed, and therefore the gripping portion 58 of the lever 54' cannot be released from contact with the spherical ball 38 of the ball joint 36.

As such, when the user desires to make another rotational adjustment of the night vision device 12, the user turns the locking screw knob 75 in a direction which threads the locking screw shaft 73 away from the threaded opening 72 of the head portion 56' of the lever 54' until the end of the locking screw shaft 73 no longer contacts the inner surface 85 of the second recess 52. At this point, the head portion 56' of the lever 54' may be depressed to allow for a rotational adjustment of the night vision device 12.

The locking screw 74 also enables for an extra torquing of the gripping portion 58 of the lever 54' into the spherical ball 38 of the ball joint 36. For example, when the locking screw 74 has contacted the inner surface 85 of the second recess 52, any further threading of the locking screw shaft 73 into the threaded opening 72 of the head portion 56' of the lever 54' causes the head portion 56' of the lever 54 to be forced away from the second recess 52, thus causing the gripping portion 58 of the lever 54' to be pivoted inwardly and even further pressed against the spherical ball 38. As such, the locking screw 74 may be used to lock the gripping portion 58 of the lever 54' against the spherical ball 38 of the ball joint 36 to a desired degree.

FIGS. 6 and 7 show another embodiment of the mounting assembly 10". The mounting assembly 10" of FIGS. 6 and 7 contains many components which are identical to those of the mounting assembly 10 of FIGS. 2 and 3. As such, the description below focuses primarily on the features of the mounting assembly 10" of FIGS. 6 and 7 which are different from that of the mounting assembly 10 of FIGS. 2 and 3.

In the embodiment of FIGS. 2 and 3, the mounting assembly 10 contains a ball joint 36, which allows for a universal rotational adjustment of the night vision device 12. In the embodiment of FIGS. 6 and 7, the mounting assembly 10" contains a cylindrical bearing, which allows for a tilting adjustment of the night vision device 12. As discussed above tilt assemblies of the prior art have the problem of having a tilt actuating mechanism which extends to a side of a mounting assembly and therefore can only be operated by one of the user's hands. As described below, the tilt actuating mechanism of the mounting assembly 10" according to one embodiment of the present invention is positioned to be easily accessible by either hand of the user.

FIG. 6 shows the mounting assembly 10" in an exploded view. As shown in FIG. 6, the mounting assembly 10" includes a body portion 34" connected to the platform 30 of the mounting assembly 10" by a tilt joint 36", such as a cylindrical bearing 80. A collar 40", is integrally formed with or otherwise attached to the cylindrical bearing 80.

The bearing plate 42" includes a cylindrical recess 44" formed therein for receiving a lower portion of the cylindrical bearing 80. As shown in FIG. 7, when the lower portion of the cylindrical bearing 80 is disposed in the cylindrical recess 44" of the bearing plate 42", the collar 40" extends below the bearing plate 42 for attachment to the platform 30 of the mounting assembly 10.

As is also shown in FIG. 7, the collar 40" includes an internally threaded end aligned with an opening 48 in the platform. A fastener 46 extends through the opening in the platform 30 and threadably engages the internally threaded end of the collar 40" to non-rotatably secure the cylindrical bearing 80 to the platform 30. As such, the cylindrical bearing 80 is also non-rotatably secured to the night vision device 12.

The mounting assembly body 34" includes a cylindrical recess 50" for receiving an upper portion of the cylindrical bearing 80. One or more fasteners 27 connect the bearing plate 42" to the mounting assembly body 34", such that the bearing plate circular recess 44" and the mounting assembly body circular recess 50" combine to form a partial cylindrical cavity for receiving the cylindrical bearing 80.

The lever 54" is pivotally mounted to the mounting assembly body 34" as described above with respect to the mounting assembly body 34 of FIGS. 2 and 3. Also as described above, the compression spring 68 biases the gripping portion 58" of the lever 54" into contact with the cylindrical bearing 80.

When the gripping portion 58" of the lever 54" is thus contacted with the cylindrical bearing 80, an inner surface of the gripping portion 58" of the lever 54" completes the upper portion of the cylindrical cavity partially formed by the bearing plate cylindrical recess 44" and the mounting assembly body cylindrical recess 50".

The mounting assembly 10" of FIGS. 6 and 7 may include either the head portion 56' of the lever 54' and locking screw 74 as shown in FIGS. 6 and 7 and described with respect to FIGS. 4 and 5, or the head portion 56 of the lever 54 as described with respect to FIGS. 2 and 3. In either event the head portion 56/56' of the lever 54" is substantially centered with respect to the mounting assembly body 34". As such when a user desires to depress the head portion 56/56' of the lever 54" the user may do so with either hand.

When the head portion 56/56' of the lever 54" is so depressed, the user may tiltingly adjust the night vision device 12 about the longitudinal axis 90 of the cylindrical bearing 80. When the night vision device 12 is tilted to a desired position, the head portion 56/56' of the lever 54", is released to allow the gripping portion 58" of the lever 54" to contact the cylindrical bearing 80 to maintain the night vision device 12 in the adjusted position.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. A mounting assembly for universally rotatably adjusting a night vision device with respect to a helmet and comprising:
    a first attachment mechanism for connection to the night vision device;
    a second attachment mechanism for connection to the helmet; and
    a universally rotatable joint for universally rotatably adjusting the night vision device with respect to the helmet about a plurality of planes extending through a center of the universally rotatable joint, the universally rotatable joint having a substantially smooth surface; and
    a fixation mechanism that permits fixation of the night vision device, the fixation mechanism comprising a lever and a body portion having a first recess for receiving the universally rotatable joint and a second recess for receiving the lever, wherein the lever is pivotally connected to the body portion and comprises a head portion and a gripping portion, and wherein the gripping portion is pivotal into and out of contact with the universally rotatable joint.

2. The assembly of claim 1, wherein the universally rotatable joint is a ball joint.

3. The assembly of claim 1, wherein the gripping portion of the lever is biased into contact with the universally rotatable joint.

4. The assembly of claim 3, wherein the head portion is movable toward the second recess of the body portion to pivot the lever out of contact with the universally rotatable joint to allow for a universal rotatable adjusting of the night vision device with respect to the helmet.

5. The assembly of claim 4, wherein the head portion of the lever is movable toward the second recess of the body portion by depressing the head portion toward the second recess of the body portion.

6. The assembly of claim 4, wherein the head portion of the lever is easily accessible by either hand of the user.

7. The assembly of claim 5, wherein the head portion of the lever comprises an opening for receiving a locking screw, and wherein the locking screw comprises an end which threadably engages an internally threaded portion of the head portion of the lever.

8. The assembly of claim 7, wherein the locking screw is movable to contact an inner surface of the second recess to prevent the head portion of the lever from being depressed.

9. A mounting assembly for universally rotatably adjusting a night vision device with respect to a helmet and comprising:
    a first attachment mechanism for connection to the night vision device;
    a second attachment mechanism for connection to the helmet;
    a body portion connected to the first attachment mechanism;
    a platform connected to the second attachment mechanism;
    a ball joint between the body portion and the platform for universally rotatably adjusting the night vision device with respect to the helmet, the ball joint having a substantially smooth surface; and
    a lever pivotally connected to the body portion and comprising a head portion and a gripping portion, wherein the body portion comprises a first recess for receiving the ball joint and a second recess for receiving the lever, and wherein the gripping portion is pivotal into and out of contact with the ball joint to permit fixation of the night vision device.

10. The assembly of claim 9, wherein the gripping portion of the lever is biased into contact with the ball joint.

11. The assembly of claim 10, wherein the head portion is movable toward the second recess of the body portion to pivot the lever out of contact with the ball joint to allow for a universal rotatable adjusting of the night vision device with respect to the helmet.

12. The assembly of claim 11, wherein the head portion of the lever is movable toward the second recess of the body portion by depressing the head portion toward the second recess of the body portion.

13. The assembly of claim 12, wherein the head portion of the lever is easily accessible by either hand of the user.

14. The assembly of claim 11, wherein the head portion of the lever comprises an opening for receiving a locking screw, and wherein the locking screw comprises an end which threadably engages an internally threaded portion of the head portion of the lever.

15. The assembly of claim 14, wherein the locking screw is movable to contact an inner surface of the second recess to prevent the head portion of the lever from being depressed.

* * * * *